(12) United States Patent
Robey

(10) Patent No.: US 6,568,538 B1
(45) Date of Patent: May 27, 2003

(54) PRINTOUT BIN JOB IDENTIFICATION AND DISPLAY

(75) Inventor: Joshua Robey, Hollis, NH (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/395,900

(22) Filed: Sep. 14, 1999

(51) Int. Cl.⁷ .......................... B07C 7/00; G06F 19/00
(52) U.S. Cl. .................... 209/630; 209/702; 700/115
(58) Field of Search .......................... 209/702, 706, 209/630; 700/115, 116; 271/298

(56) References Cited

U.S. PATENT DOCUMENTS

| | | | | |
|---|---|---|---|---|
| 5,435,544 A | * | 7/1995 | Mandel | 271/298 |
| 5,602,973 A | * | 2/1997 | Nishiwaki | 395/113 |
| 6,381,509 B1 | * | 4/2002 | Thiel et al. | 700/115 |

* cited by examiner

Primary Examiner—Tuan N. Nguyen
(74) Attorney, Agent, or Firm—John F. Schipper

(57) ABSTRACT

Method and system for identifying and facilitating access to computer printouts contained in an array of printout bins. Each printout is provided with indicium information concerning the project and/or the user for whom the printout was prepared. When the printout is placed in a bin, the indicium information is entered and displayed adjacent to the printout bin. A user examines the bin displays, identifies the bin(s) containing the user's printout(s), removes the printout and advises the system that the printout has been removed. Thereafter, the display no longer includes indicium information for the removed printout. One or more bins for confidential printouts can be locked, with bin access allowed only if (1) acceptable confidential user identification is presented and (2) at least one printout for that user is presently contained in the locked bin. Indicium information can be communicated to the printout bin or to a project monitor independently of whether a printout is prepared.

20 Claims, 4 Drawing Sheets

INDICIUM INFORMATION

USER NAME

USER IDENTIFICATION NO.
  (NON-CONFIDENTIAL)

USER IDENTIFICATION NO.
  (CONFIDENTIAL)

USER PROJECT IDENTIFICATION NO.

PRINTER PROJECT RUN NO.

DATE PRINTED

TIME PRINTED

RELATED PRINTOUTS WITHIN LAST 24 HOURS

WHETHER PRINTOUT WAS PHYSICALLY PREPARED

*Fig. 2*

PRINTOUT BIN JOB IDENTIFICATION AND DISPLAY

FIELD OF THE INVENTION

This invention relates to identification of printer output jobs in an efficient and distinguishable manner.

BACKGROUND OF THE INVENTION

An office printer in a large network may have multiple physical output bins, which are usually used for collation but can also be used to separate and distinguish different print jobs. If bins are used to separate different print jobs, the printer firmware must decide at print time into which bin a print job will be placed, based on which bins are empty or not yet filled. When the user retrieves a print job from a printer, the user is initially unaware into which bin the user's print job has been placed and must, therefore, examine several or all bins until the sought-after print job is located, by physically examining the printed output(s) in each such bin. This is an inefficient use of the user's time and can lead to confidentiality problems.

What is needed is an approach that (1) works cooperatively with and does not interfere with conventional distribution of computer printouts to arbitrary bins, (2) provides a means of quickly and visually identifying which printouts are deposited in which bins, (3) takes prompt account of removal of a printout from a recipient bin and (4) optionally provides for some confidential printouts to be placed in selected bins.

SUMMARY OF THE INVENTION

These needs are met by the invention, which provides an approach that visually identifies which printouts remain in each recipient bin, using a visual display at or adjacent to each bin. Each bin is provided with a visually perceptible indicium, such as a liquid crystal display (LCD) or similar distinguishing medium that includes indicium information that uniquely identifies at least one of (1) the user by name, PIN number or similar user indicium, (2) the user project number, (3) the user project run number, (4) the date and/or time the printout was prepared and (5) any other useful and distinguishing information concerning the user and/or the printout.

In one embodiment, as each printout is placed in a bin, part or all of the indicium information is displayed adjacent to the bin. A user examines the display associated with each bin, identifies a bin in which the user's printout(s) is contained, removes the user's printout(s), and indicates, using a touch screen or other information entry device, that the user's printout(s) is now removed. Thereafter, the removed printout indicium information no longer appears on the display.

In another embodiment, a bin is provided with a paper sensor, which determines if one or more sheets of paper or printouts is present and which can clear itself when no paper is present in the bin.

In another embodiment, selected bins are locked and contain confidential information (printouts, etc.). A user must enter a PIN or similar user identification number in order to gain access to, and remove the user's printout from, a locked bin. Again, when a user's printout is removed from a locked bin, the user indicium information for that printout is removed from the display.

In another embodiment, a computer that would provide a printout communicates directly with a printout bin, without necessarily preparing a printout to be placed in the bin, and provides the printout bin or a bin surrogate with the indicium information, for display, for record keeping or for some other purpose. In this embodiment, the indicium information is provided or transmitted irrespective of whether or not a printout is ever prepared for the underlying data.

BRIEF DESCRIPTION OF THE DRAWINGS

FIG. 2 illustrates a suitable format for indicium information.

DESCRIPTION OF THE INVENTION

Figure 1:
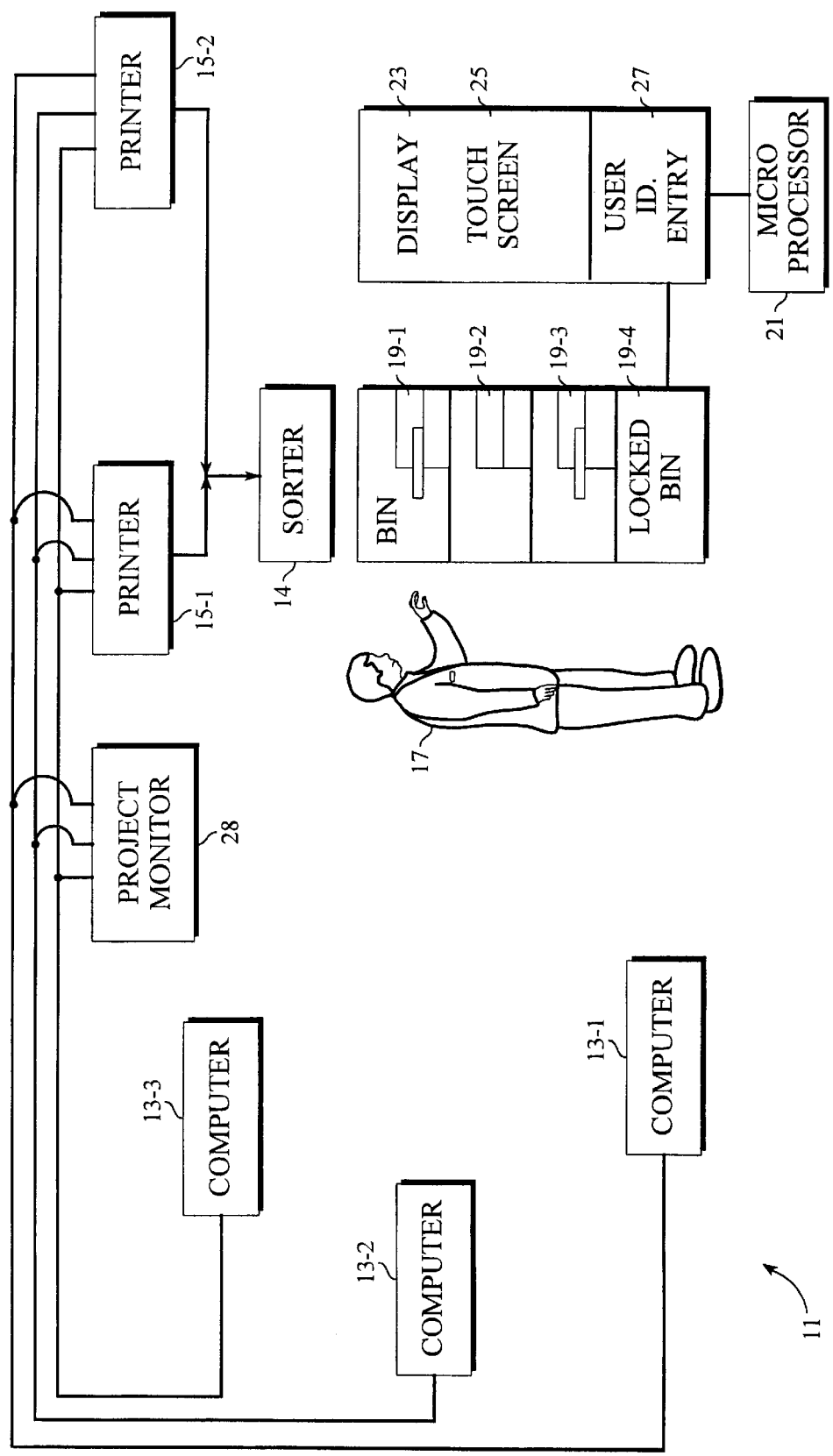
FIG. 1 is a schematic view of an environment in which the invention can be used.

FIG. 1 illustrates one environment for practicing the invention. A computer network I1 includes a plurality of computers 13-j (j=1, 2, 3, . . . ) that are connected to one or more printers 15-k (k=1, 2, . . . ) that provide printouts for the network. A printer, such as 15-2, completes a computation project, provides a printout for the project, and preferably provides an electronically perceptible indicium for a bin sorter 14 indicating into which bin the printout should be placed. The indicium information, includes at least one of: 1) user name, PIN number or similar user indicium, (2) user project number, (3) user project run number, (4) date and/or time the printout was prepared; (5) date and/or time the project was completed; and (6) any other useful and distinguishing information concerning the user and/or the printout. Optionally, the bin sorter 14 is programmed to place printouts for a selected group of users in a particular bin or group of bins. Alternatively, the bin sorter 14 is optionally programmed to place printouts for a selected group of projects (sorted by topic and/or by working group and/or by confidentiality level) in a particular bin or group of bins. In this embodiment, the electronically perceptible indicium need not be read again after the indicium is communicated to the sorter 14.

In a second embodiment, a printer, such as 15-2, completes a computation project for a user 17 and provides a printout, including an electronically or visually perceptible indicium that contains indicium information, including at least one of: 1) the user name, PIN number or similar user indicium, (2) the user project number, (3) the user project run number, (4) the date and/or time the printout was prepared and (5) any other useful and distinguishing information concerning the user and/or the printout. The indicium may be, for example, a one-dimensional or two-dimensional bar code or other electronically readable information label containing this information and is intended to be subsequently read by an indicium reader for later classification or some other purpose.

Before the printout is placed in a printout bin 19-i (i=1, 2, . . . ) in this second embodiment, an indicium reader associated with the printout bin is passed across the indicium, and the indicium information is downloaded to a microprocessor 21 associated with the bin, or associated with a group of printout bins 19-i.

In either embodiment of the invention, part or all of the indicium information is visually displayed on a small display 23 that is located adjacent to each of the printout bins 19-i. The user 17 examines the information appearing on each printout bin display, identifies at least one bin that contains a printout for the user, and removes the printout from the appropriate bin.

Optionally, a printout bin display may have a touch-sensitive screen or similar information input device 25. At the time the user 17 removes the printout from the bin 19-i, the user touches the display screen 25 where the user's printout information is displayed, and the microprocessor 21 notes the date and time the printout was removed from the register. Preferably, the microprocessor records a permanent history of which project printouts were placed into which bins, and the dates and times the printouts were removed from each bin. Alternatively, the bin includes a paper sensor that clears itself when all paper has been removed from the bin. As a second alternative, the user 17 can pass another indicium reader across a printout at the time the user removes the printout from the bin 19-i.

The printout that was removed from the bin, and whose removal was noted using the touch screen 25, no longer appears on the display 23. Periodically, once every 7 days for example, the microprocessor 21 can provide a printout of which bins contain printouts that appear to have remained in a bin for at least a threshold time interval $\Delta t(thr)$, such as 15 days. A user whose printout has remained in a bin for a time interval of at least $\Delta t(thr)$ can be notified to pick up the "aged" printout; or the "aged" printout can be discarded if the user does not respond.

In a second embodiment, selected bins, such as 19-4, are kept locked and can only be opened by entry of acceptable user information, such as a user PIN into a user id. entry module 27. The indicium information is again displayed on the display screen and is removed from the screen when the microprocessor is informed that the user has removed a printout. Alternatively, the microprocessor can automatically remove indicium information for an identified user when the user enters his/her PIN and opens the bin, presumably to retrieve all the user's printout that are contained in the bin.

In another embodiment, a computer 13-j that is the source of the results of, or is aware of the completion of, the computation project communicates directly with the appropriate printout bin 19-i, or with a separate computation project monitor 28, and provides the recipient with selected indicium information, independently of whether a printout is prepared or is physically placed in a printout bin. This indicium information may include an indication of whether or not a printout has been prepared for, or has been physically placed in, a printout bin at the time this indicium information is communicated to the recipient. The indicium information received by the recipient may be displayed, stored in memory or elsewhere for record keeping purposes, analyzed or otherwise used for quality control purposes, used as a check against subsequent delivery of a printout to a printout bin, or used for some other relevant purpose (referred to collectively as "monitoring purposes").

FIG. 2 illustrates a suitable format for presenting indicium information concerning the user and/or the printout project. The indicium information may include any or all of the following:

user name
user non-confidential identification number
user confidential identification number
user project identification number
printer project run number
date and/or time the printout was prepared
date and/or time the project was completed
number of related printouts prepared within last 24 hours
whether a printout was physically prepared The user confidential identification number preferably does not appear on the display adjacent to the bin in which the printout is placed. The user confidential identification number placed on the printout preferably is associated, through the microprocessor, with a second (non-identical) user confidential identification number that must be presented by the user in order to gain access to a locked bin containing one or more of the authorized user's printouts. Use of associated first and second (non-identical) user confidential identification numbers helps preserve confidentiality: a non-authorized user who obtains knowledge of the first (authorized) user confidential identification number will be unable to gain access to a locked printout bin unless (1) the bin contains at least one printout for an authorized user and (2) the unauthorized user has knowledge of the second (authorized) user's confidential identification number.

Figure 3:
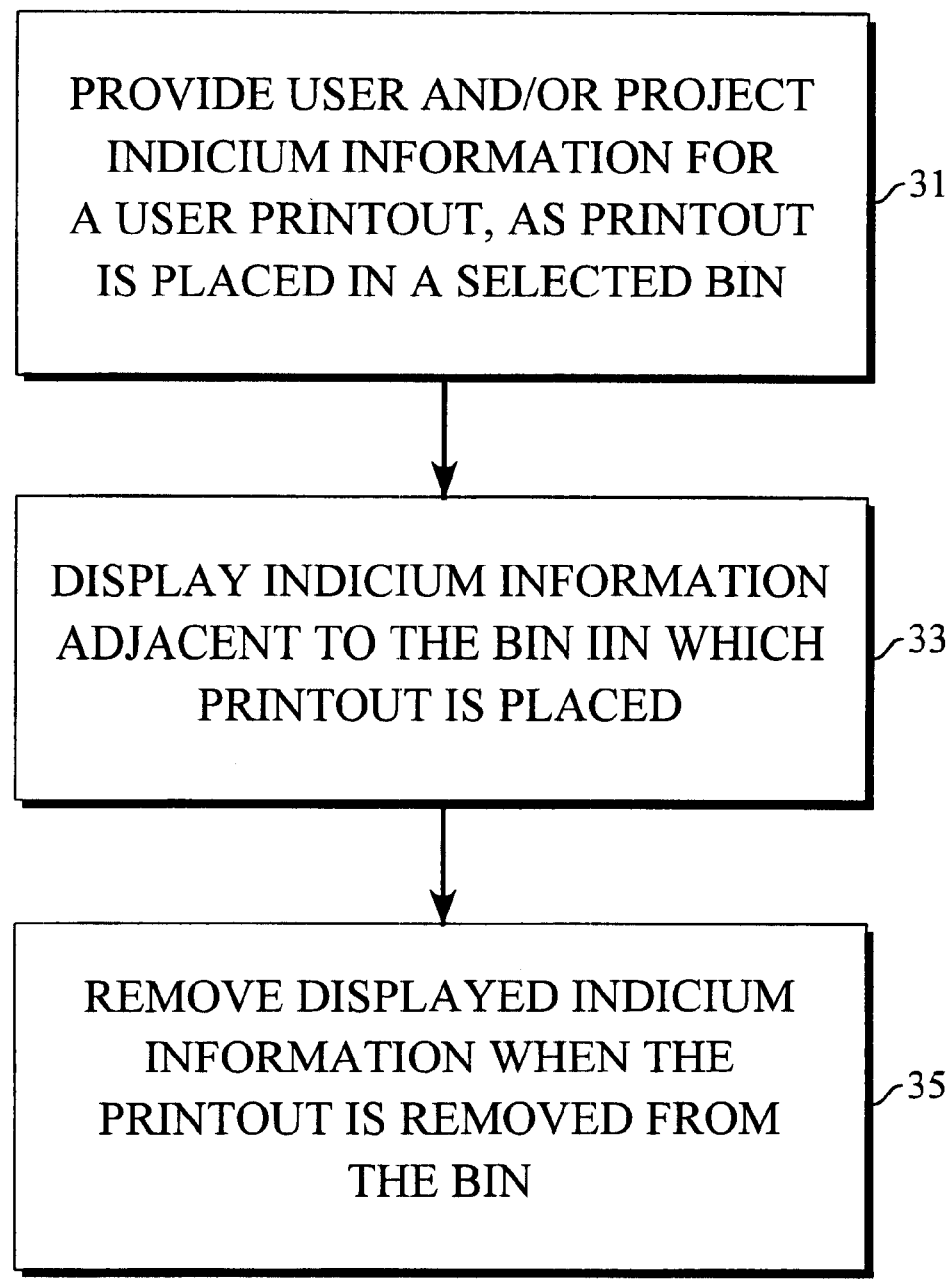
FIGS. 3 and 4 are flow charts of procedures for practicing the invention.

FIG. 3 is a flow chart of a procedure for practicing the invention. In step 31, a system provides selected user and/or project indicium information, as a printout is placed in a selected bin. In step 33, the indicium information is displayed adjacent to the bin in which the printout is placed. In step 35, the displayed indicium information is removed when the printout is removed from the bin.

Figure 4:
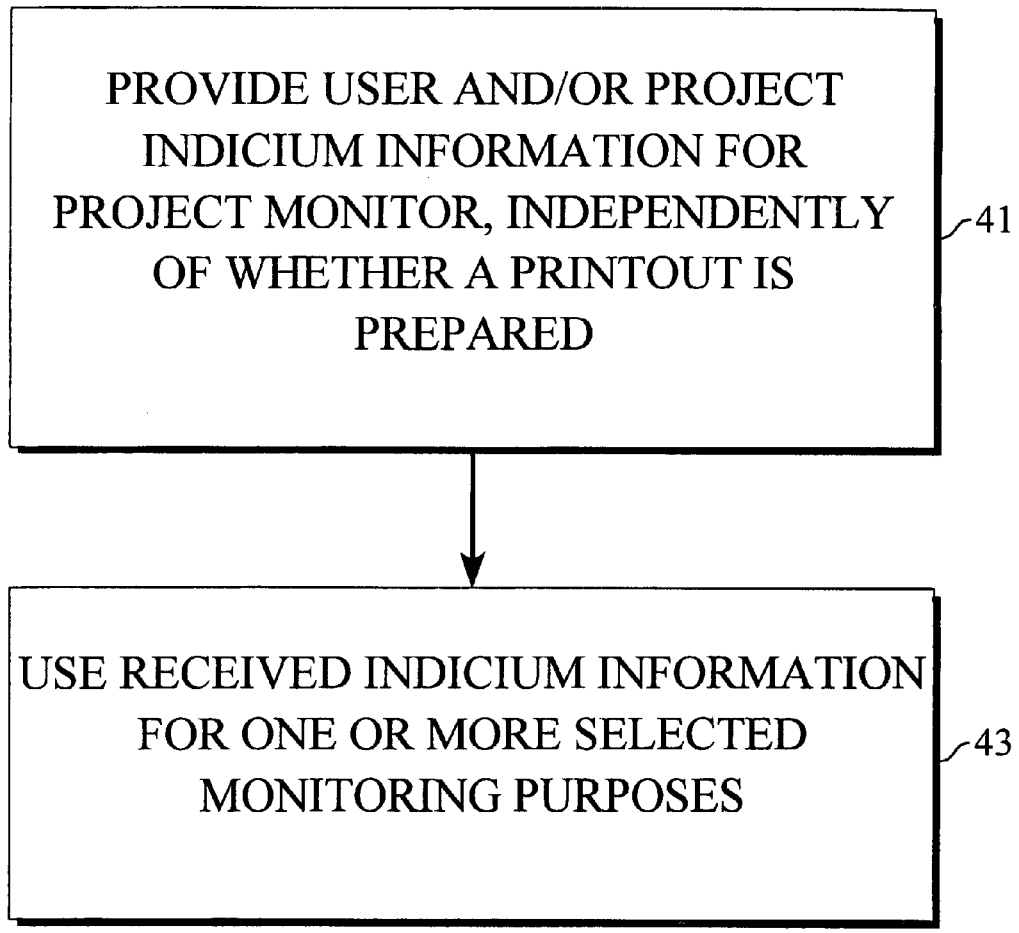

FIG. 4 is a flow chart of an alternative procedure for practicing the invention. In step 41, a system provides selected user and/or project indicium information, independently of whether a printout is prepared (or is placed in a selected bin). In step 43, the communicated indicium information is used for one or more monitoring purposes.

What is claimed is:

1. A system for identifying and facilitating access to a computer printout contained in an array of printout bins, the system comprising:

an information provider that associates a first indicium with at least one of a user who requested preparation of a selected computer printout and a computer project with which the printout is associated;

a security computer that is programmed:

to prepare a computer printout reporting selected results from the project, to use the first indicium information to select a locked printout bin, and to place the computer printout into the selected printout bin, when the requested computer project is completed; and to allow the user to open the selected printout bin only upon presentation of both of (i) information identifying the selected printout bin and (ii) a confidential second indicium that is independent of the first indicium.

2. The system of claim 1, wherein said selected indicium information includes at least one of the following: user name, user identification, user project number, user project run number, date a printout was prepared, time the printout was prepared, date the information contained in the printout was prepared, time the information contained in the printout was prepared, and number of related printouts prepared within a selected time interval.

3. The system of claim 1, further comprising a computer-based recorder for recording at least one of time and date for at least one of the following events; said printout is placed into said printout bin and said printout is removed from said printout bin.

4. The system of claim 3, wherein:

said recorder records at least one of said date and said time said printout is placed in said printout bin; and, when said printout has remained in said printout bin for at least a second selected time interval $\Delta t(thr)$ after said printout was placed in said printout bin, said system takes at least one of the following actions: advising said user that said printout has remained in said printout bin for at least the second selected time interval, and removing said printout from said printout bin.

5. The system of claim 1, wherein said system provides said user with a third indicium indicating that said printout that is presently contained in said printout bin is being removed from said printout bin.

6. The system of claim 1, further comprising a computer-based recorder for recording at least one of time and date for at least one of the following events: said printout is placed into said printout bin, and said printout is removed from said printout bin.

7. The system of claim 6, wherein:

said recorder records at least one of date and time said printout is placed into said printout bin; and when said printout has remained in said printout bin for at least a second selected time interval $\Delta t(thr)$ after said printout was placed in said printout bin, said system takes at least one of the following actions: advising said user that said printout has remained in said printout bin for at least the second selected time interval, and removing said printout from said printout bin.

8. The system of claim 1, further comprising a computer-based indicium information reader that receives and visually displays at least a selected portion of said indicium information in association with a selected printout bin into which said printout is placed.

9. The system of claim 1, further comprising a printout sensor, positioned in or adjacent to said printout bin, that senses and indicates when all printouts have been removed from said printout bin.

10. The system of claim 1, wherein said security computer is further programmed to said user to open said selected printout bin only if said selected printout bin presently contains at least one printout that was requested by said user.

11. A method for identifying and facilitating access to a computer printout contained in an array of printout bins, the method comprising:

associating a first indicium with at least one of a user who requested preparation of a selected computer printout and a computer project with which the printout is associated;

when the requested computer project is completed, preparing a computer printout reporting selected results from the project, using the first indicium information to select a locked printout bin, and placing the computer printout into the selected printout bin; and allowing the user to open the selected printout bin only upon presentation of both of (i) information identifying the selected printout bin and (ii) a confidential second indicium that is independent of the first indicium.

12. The method of claim 11, further comprising choosing said selected indicium information to include at least one of the following: user name, user identification, user project number, user project run number, date the printout was prepared, time the printout was prepared, date the information contained in the printout was prepared, time the information contained in the printout was prepared, and number of related printouts prepared within a selected time interval.

13. The method of claim 11, further comprising recording at least one of time and date for at least one of the following events; said printout is placed into said printout bin and said printout is removed from said printout bin.

14. The method of claim 13, further comprising:

recording at least one of said date and said time said printout is placed in said printout bin; and when said printout has remained in said printout bin for at least a second selected time interval $\Delta t(thr)$ after said printout was placed in said printout bin, taking at least one of the following actions: advising said user that said printout has remained in said printout bin for at least the second selected time interval, and removing said printout from said printout bin.

15. The method of claim 11, further comprising providing said user with a third indicium indicating that said printout that is presently contained in said printout bin is being removed from said printout bin.

16. The method of claim 11, further comprising recording at least one of time and date for at least one of the following events: said printout is placed into said printout bin, and said printout is removed from said printout bin.

17. The method of claim 16, further comprising:

recording at least one of date and time said printout is placed into said printout bin; and when said printout has remained in said printout bin for at least a second selected time interval $\Delta t(thr)$ after said printout was placed in said printout bin, taking at least one of the following actions: advising said user that said printout has remained in said printout bin for at least the second selected time interval, and removing said printout from said printout bin.

18. The method of claim 11, further comprising providing said indicium information in an electronically perceptible format on at least one page of said printout.

19. The method of claim 11, further comprising sensing and indicating when all printouts have been removed from said printout bin.

20. The method of claim 11, further comprising allowing access to said selected printout bin by said user only if said selected printout bin presently contains at least one printout that was requested by said user.

* * * * *